US012754996B2

(12) United States Patent
Collado Umana et al.

(10) Patent No.: US 12,754,996 B2
(45) **Date of Patent: *Oct. 6, 2026**

(54) MACHINE LEARNING MODEL PARAMETER BASED ENCRYPTION

(71) Applicant: HiddenLayer, Inc., Austin, TX (US)

(72) Inventors: Julian Collado Umana, Irvine, CA (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 19/094,688

(22) Filed: Mar. 28, 2025

(65) Prior Publication Data

US 2026/0087122 A1 Mar. 26, 2026

Related U.S. Application Data

(63) Continuation of application No. 18/892,232, filed on Sep. 20, 2024, now Pat. No. 12,314,378.

(51) Int. Cl.
*G06F 21/46* (2013.01)
*H04L 9/08* (2006.01)
(Continued)

(52) U.S. Cl.
CPC ............ *G06F 21/46* (2013.01); *H04L 9/0838* (2013.01); *H04L 9/00* (2013.01); *H04L 9/08* (2013.01);
(Continued)

(58) Field of Classification Search
CPC ... G06F 21/46; H04L 9/00; H04L 9/08; H04L 9/0869; H04L 9/088; H04L 9/083; H04L 9/0838; H04L 9/14
See application file for complete search history.

(56) References Cited

U.S. PATENT DOCUMENTS 8,151,110 B2 4/2012 Vantalon et al.
9,038,139 B2 5/2015 Vandemar
(Continued)

OTHER PUBLICATIONS

"Steganography on Cryptography Text Using Neural Networks"—Aarsh Baraia, National College or Ireland, School of Computing, Aug. 16, 2021 https://norma.ncirl.ie/5101/1/aarshrajeshbararia.pdf (Year: 2021).*
(Continued)

*Primary Examiner* — Randy A Scott
(74) *Attorney, Agent, or Firm* — Jones Day

(57) ABSTRACT

A first password is received by a password encoder which uses the first password to generate a first key. This first key is used to modify weights and biases of an encoder to result in a modified encoder. Further, weights and biases of a decoder operating in tandem with the encoder based can be modified based on a second key to result in a modified decoder. First data is received which encapsulates second data in a hidden compartment. The first data is encoded by the modified encoder to result to generate an embedding. The modified decoder decodes the embedding to result in a representation of the second data which, in turn, can be provided to a consuming application or process. The first data can be input into the encoder and the decoder prior to those components being modified to result in a representation of the first data.

30 Claims, 10 Drawing Sheets

(51) Int. Cl.

| | |
|---|---|
| ***H04L 9/14*** | (2006.01) |
| ***H04L 9/40*** | (2022.01) |
| *H04L 9/00* | (2022.01) |

(52) U.S. Cl.

CPC ............ *H04L 9/0869* (2013.01); *H04L 9/088* (2013.01); *H04L 9/14* (2013.01); *H04L 63/083* (2013.01)

(56) References Cited

U.S. PATENT DOCUMENTS

| | | | | |
|---|---|---|---|---|
| 10,540,490 | B2 * | 1/2020 | Chari | H04L 63/083 |
| 11,709,954 | B2 | 7/2023 | Kshirsagar et al. | |
| 12,242,622 | B1 | 3/2025 | Collado Umana et al. | |
| 12,254,104 | B1 | 3/2025 | Collado Umana et al. | |
| 12,314,378 | B1 | 5/2025 | Collado Umana et al. | |
| 2003/0072446 | A1 * | 4/2003 | Jaquette | G06F 21/6209 380/46 |
| 2020/0084427 | A1 * | 3/2020 | Sun | G06N 3/0895 |
| 2021/0152351 | A1 * | 5/2021 | Anson | H04L 9/0869 |
| 2022/0335160 | A1 * | 10/2022 | Chapman | G06N 3/048 |
| 2025/0055673 | A1 * | 2/2025 | Stehle | H04L 9/3226 |

OTHER PUBLICATIONS

"HiNet: Deep Image Hiding by Invertible Network"—Jing et al., IEEE/CVF International Conference on Computer Vision (ICCV), Oct. 17, 2021 https://ieeexplore.ieee.org/document/9711382 (Year: 2021).*

* cited by examiner

MACHINE LEARNING MODEL PARAMETER BASED ENCRYPTION

RELATED APPLICATION

The current application claims priority to U.S. patent application Ser. No. 18/892,232 filed on Sep. 20, 2024, the contents of which are hereby fully incorporated by reference.

TECHNICAL FIELD

The subject matter described herein relates to techniques for encrypting and decrypting data using machine learning models in which select data can be encapsulated within hidden compartments.

BACKGROUND

Data obfuscation is the process of replacing sensitive information with data that looks like plausible data and adds an additional layer of security. In the event of a breach or other compromising scenario, the plausible data might be sufficient to satisfy the interests of the malicious actor thereby protecting the sensitive information.

SUMMARY

In a first aspect, a first password is received by a password encoder. The password encoder, using this first password, generates a first key. This first key is used to modify parameters of an encoder model (e.g., weights and/or biases) of an encoder to result in a modified encoder. Further, parameters of a decoder model (e.g., weights and/or biases) of a decoder operating in tandem with the encoder based can be modified based on a second key to result in a modified decoder. First data is received which encapsulates second data in a hidden compartment. The first data is encoded by the modified encoder to result to generate an embedding. The modified decoder decodes the embedding to result in a representation of the second data which, in turn, can be provided to a consuming application or process. The first data can be input into the encoder and the decoder prior to those components being modified to result in a representation of the first data.

A second password can be received by the password encoder which, in turn, can generate the second key. The first password and the second password, in some variations, are different. In other variations, the first password is the same as the second password.

The second password, in some implementations, can be generated by a second password encoder.

The first data can be a first image and the second data can be a second, different image.

The first key can be different than the second key. In other variations, the first key can be the same as the second key.

In some variations, only weights and biases of the encoder can be modified. In such an arrangement, the modified encoder is used in tandem with the original decoder. In other variations, only weights and biases of the decoder are modified. In such arrangements, the modified decoder is used in tandem with the original encoder.

In a further aspect, first data is received which encapsulates second data in a hidden compartment. Thereafter, a password is received by a password encoder which uses such password to generate a key. The first data and the key are combined to generate the second data (i.e., the hidden data). The second data is then provided to a consuming application or process.

The password encoder can include a neural network. In such variations, the neural network can be trained using stochastic gradient and a loss function that minimizes mean squared error with a single of multiple passwords to keys as a training dataset.

The consuming application or process can load the second data into memory, store the second data in physical persistence, transmit the second data over a network to a remote computing device, and/or causes the second data to be displayed in graphical user interface.

The first data can encapsulate third data in the hidden compartment. In such an arrangement, a second password is received by the password encoder which then, using the second password, generates a second key. The first data and the second key can be combined to generate the third data. This third data can be provided to a consuming application or process. In some variations, the hidden compartment encapsulates multiple data of interest (e.g., multiple images, etc.) which each have a corresponding, different key which are generated using a respective password and the password encoder.

The first data can be a first image and the second data can be a second, different image. The first data can be a first audio file and the second data can be a second, different audio file. The first data can be a first video file and the second data can be a second, different video file. The first data can be a first text file and the second data can be a second, different text file. The first data can be a file of a first type (e.g., video file, etc.) and the second data can be a file of a second, different type (e.g., text file, etc.).

In other aspects, an embedding of first data is generated by an encoder forming part of a model. The model also includes a decoder and encapsulates second data in a hidden compartment. A password is received by a password encoder to result in the password encoder generating a key. A combination of the embedding and the key is input into a decoder to generate the second data. The second data can be provided to a consuming application or process.

In yet another aspect, a password is received by a password encoder. The password is used by the password encoder to generate a key. Subsequently (or prior to), first data is received that encapsulates second data in a hidden compartment. A combination of the first data and the key are input into an autoencoder to generate the second data. The second data can be provided to a consuming application or process.

In another aspect, a password is received by a password encoder. Using this password, the password encoder generates a key which can be used to access data encapsulates in hidden compartments. The key can be provided to a consuming application or process.

The consuming application or process can combine the key with an image or an embedding thereof to reveal the data encapsulated in a hidden compartment of the image.

The consuming application or process can causes the combination of the key with the image or the embedding thereof to be decoded by a decoder.

The consuming application or process can cause the combination of the key with the image to be processed by an autoencoder.

In another interrelated aspect, an encoder receives first data encapsulating second data in a hidden compartment along with a decoder identifier corresponding to either of a first decoder or a second decoder. The encoder then generates an embedding corresponding to the first data. The first decoder decodes the embedding to result in a representation of the first data when the decoder identifier corresponds to the first decoder. The second decoder decodes the embedding to result in a representation of the second data when the decoder identifier corresponds to the second decoder. The decoded embedding can be provided to a consuming application or process.

In other variations, an encoder receives first data encapsulating second data and third data in a hidden compartment along with a decoder identifier corresponding to either of a first decoder or a second decoder. The encoder then generates an embedding corresponding to the first data. The first decoder decodes the embedding to result in a representation of the second data when the decoder identifier corresponds to the first decoder. The second decoder decodes the embedding to result in a representation of the third data when the decoder identifier corresponds to the second decoder. The decoded embedding can be provided to a consuming application or process.

The consuming application or process can load the decoded embedding into memory, store the decoded embedding in physical persistence, transmit the decoded embedding over a network to a remote computing device, and/or cause the decoded embedding to be displayed in graphical user interface.

The first data can be a first image and the second data can be a second, different image.

The decoded embedding can be an image.

The first decoder and second decoder can each comprise a respective neural network. Such neural networks, for example, can be trained using stochastic gradient descent and a loss function that minimizes mean squared error with a single of multiple passwords to keys as a training dataset.

The encoder and the decoders can form part of a encoder-multi-decoder model architecture. In some implementations, a single encoder is shared across the decoders.

The decoder identifier can be generated in different ways including, for example, through user-generated input in a graphical user interface.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for selectively obscuring sensitive data using machine learning.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
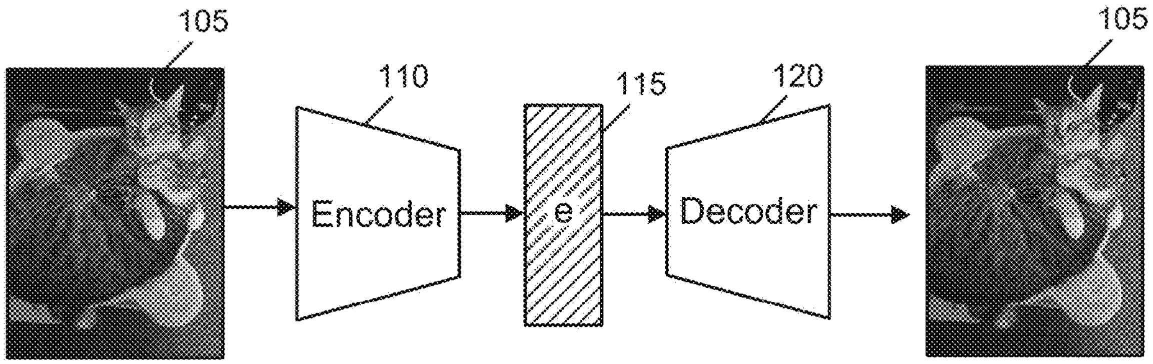
FIG. 1 is a diagram illustrating an autoencoder architecture.

The current subject matter is directed to enhanced techniques for encrypting and decrypting data using machine learning models. In particular, the current subject matter provides a way to encrypt data alongside its respective decryption key and to decrypt different plausible data values depending on which decryption key is used. This arrangement has the effect of giving the impression that the encrypted data has been decrypted but in practice it is a dummy dataset while being able to protect the data of interest. As used herein, the term hidden compartment refers to techniques for obfuscating data within encrypted or other data and/or to techniques for obfuscating data within one or more components of a model.

The current subject matter allows for the ability to hide data in plain sight; namely having a publicly visible or encrypted version of data and using a machine learning model with a key in order to obtain the secret data. In this case the encrypted version of the secret data simply looks like normal data.

The data can be of varying types including one or more of: audio, video, text, image files. In some variations, the hidden data is of a different type than the encrypted data (e.g., a video file is hidden in an image file, etc.).

The current subject matter is applicable to a wide variety of use cases, a few examples are provided below.

Hostile individuals forcing a password. As an example, a worker from a corporation in country A is going in a business trip to country B. The worker is going with their work laptop and stored on it are secret documents relating to intellectual property or future expansion plans, these documents are encrypted for security purposes, for example, if the laptop is stolen. At some point during the trip the worker might face hostile individuals that force the worker to provide a decrypted copy of the documents in its laptop. The worker facing no other choice, provides a password and the secret data is decrypted and now in hands of the hostile individuals.

If the worker had used the current subject matter to encrypt its data, the encrypted data would have two or more passwords. The real password would decrypt the secret data and make it available for the worker. One or more fake passwords would decrypt a different dataset that looks legitimate and would satisfy the hostile individuals.

Increasing the cost of malicious attacks. A user wants to protect some secret data and thus encrypts it. There might be some malicious actors that are attempting to access this data, they have obtained access to the encrypted data but are currently not able to decrypt it. The malicious actors subsequently start trying different mechanisms for password guessing, like brute force among others. In a typical case the malicious actor can try many passwords and each time that it is wrong it would simply get an error message. With the current subject matter, there can be one of more fake passwords that might be easier to guess than the real password and, when triggered, the malicious actor would get a plausible version of the data. The malicious actor now has to go through the data and guess if the data that they have obtained is the real data or some fake data and they have to decide if they want to keep trying to guess the password or not. As the malicious actor does not know the data it received is the real data or not, there might or might not be an another password to guess making this a very resource consuming endeavor for the malicious actor, and thus dissuading them from trying to decrypt the data.

The current subject matter can leverage autoencoders. An autoencoder is a type of machine learning model in which the model is tasked with learning to output the input it is given. The key modification that makes this useful is that at some point in the model, the size of the representation of the input is smaller than the input and output size. For example, with reference to FIG. 1, in the case of a neural network working with an input image 105, the image size might be 32×32, thus having 1024 pixel values or input features. At some point, there is a bottleneck hidden layer that has only 100 hidden units and which generates an embedding 115 (an embedding is sometimes pictorially abbreviated as "e"). This arrangement forces the model to learn a representation of the 1024 values into only 100 values, thus creating a compressed version of the input (i.e., the embedding 115). Stated differently, the bottleneck layer, as used herein, can refer to a layer with a significantly smaller number of neurons compared to the layers before and after it and which generates an embedding 115. The bottleneck layer can serve to reduce the dimensionality of the data and extract the most important features before expanding the data back to its original dimensionality. The section of the model before the bottleneck is called an encoder 110 and the section of the model after the bottleneck hidden layer is called a decoder 120.

Architectures different from an encoder can also be utilized. In some variations, an embedding model can be utilized in lieu of the autoencoder model. Other techniques for generating embeddings can be used—such as a large language model (LLM) and the like.

The compact representation (i.e., the 100 unit representation) can be also referred to as an embedded space because it can also embed information about a dataset and the relation between different inputs (e.g., creating clusters of similar samples in the embedded space, etc.). This relationship information is typically only manifested if the model is trained on multiple samples because the model needs to learn the relation between these samples. Note that the encoder 110 and decoder 120 can be trained specific to each dataset, so that the autoencoder model can be re-used by other models/architectures to take advantage of the information included in the embedded space.

Traditionally these models have been used for de-noising. For example by training the model to remove noise from images, the idea being that if the model input had noise, so it was x_1+noise and the model had to reconstruct x_1, after a while the model will learn to remove random noise from the image.

If a model is not trained, the result from the model will be essentially noise. In addition, it is noted that most auto encoders are deterministic as they are just performing a plurality of matrix multiplications; however, it is possible to make an auto-encoder non-deterministic, for example, with a variational autoencoder.

Storing information in the key using a machine learning model Suppose that one wants to hide data sample x_1, one way to do this is by having x_0 stored, where x_0=x_1−k_1 and x_0 is also a plausible representation of the data x_1 that is being hidden. Then in order to reconstruct x_1 all one needs to do is x_0+k_1, in other words, k_1=x_0−x_1. The problem with this is that k_1 may be very difficult to memorize or store as a password since it has to be of the same shape as x_1 and x_2. For example in the case of a 32×32 pixel image the user would have to memorize a vector of 1024 values. To solve this problem, a machine learning model M can be configured to learn the mapping between a human memorizable password p_1 and k_1. One such model could be a neural network. In this case, the model M can be taught/configured to learn a transformation such that M(P_1)=k_1.

Note that this procedure can be used to create multiple transformations of the data, for example, the model can be taught to map M(P_2)=k_2, where x_2=x_0+k_2. In practice, this allows for the recovery of different versions of the data from x_0 depending on which password (p_1, p_2) is used.

This model can be trained using stochastic gradient descent and a loss function that minimized the mean squared error with a single or multiple passwords to keys as the dataset. The input may also be preprocessed, for example by subtracting the mean and dividing by the standard deviation.

$$\text{Loss}=\text{minimize}(\text{MSE}(k\_i,M(P\_i)))$$

Note that this procedure will also work if the data is represented in some other space, for example an embedded space e_x_0.

Figure 2:
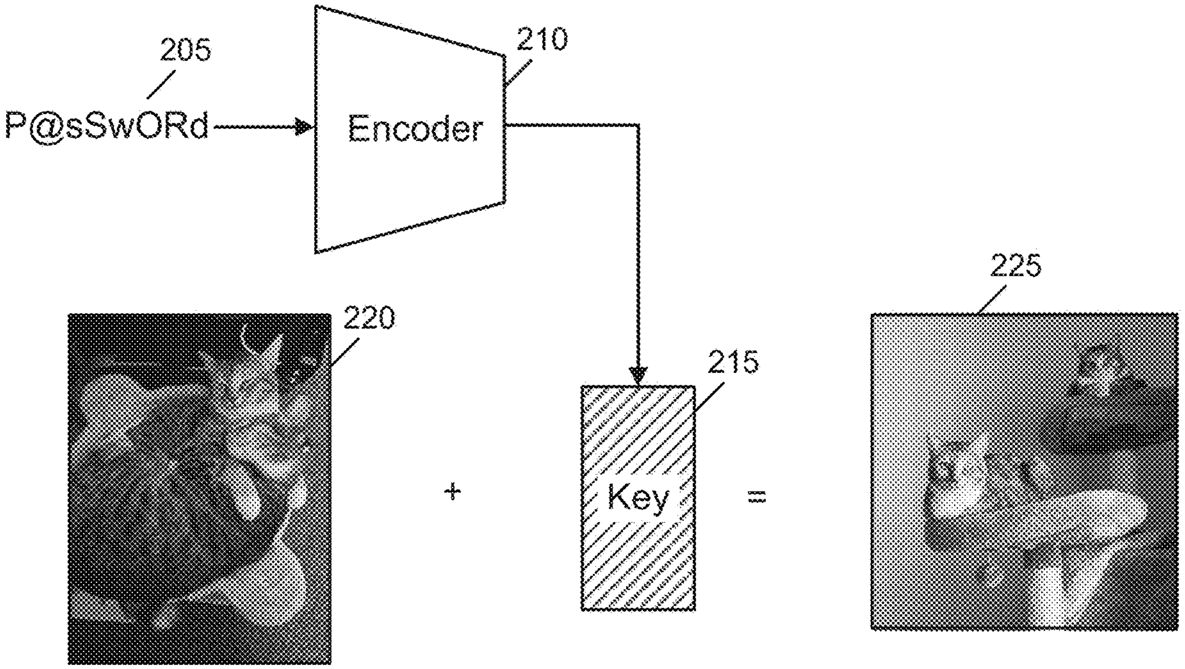
FIG. 2 is a diagram illustrating an architecture for accessing hidden data using a key generated by way of machine learning.

FIG. 2 is a diagram illustrating the storage of information in a key using machine learning. Here a password 205 can be inputted into a password encoder 210 (e.g., an encoder model) which is specifically trained and configured to generate a key 215. The workflow of 205-215 can be used in a standalone manner (i.e., the technique for generating the key 215 is useful for different applications). In some variations, the key 215 can be, for example, an embedding which when combined (through any of various operation types, etc.) with a reference image 220 can result in hidden data (i.e., secret data)—namely an image 225. Stated differently, the file of the first image 220 can encapsulate the second image 225 and the second image 225 is accessible using the key 215 generated by the password encoder 210 responsive to an inputted password 205.

Adding key in an embedded space. Given some data x_1, normally one can create an embedded (compressed) version of the data e_x_1 using an encoder-decoder architecture, for example an autoencoder. The encoder part can be used to create the embedded representation and then the data x_1 can be recovered up to a reconstruction error, using the decoder part of it. This arrangement is normal behavior for an autoencoder or any embedding model.

With the current subject matter, the embedded representation of the data e_x_1 can be treated as encrypted because it is not interpretable to a human in its current form and it needs to be decoded by a pre-trained model in order to be useful.

An encoder can be trained such that x_1 will be embedded into e_x_1.

Normally, when the decoder receives e_x_1 as input it would output x_1. In contrast, the decoder can be trained such that when it receives (e_x_1+k_1) it will output x_1. But when the decoder receives (e_x_1+k_2) as input, the decoder will output x_2, and when the decoder receives e_x_1 as input, the decoder will output x_0.

The latter case can be interpreted as e_x_1+k_0 where k_0 is a key in which all values are zero, therefore leaving e_x_1 unmodified. If the model receives a key k_e for which it was not trained, it will output something that looks like random noise, which is the default behavior of these types of models.

Note that what this means is that if the encrypted (embedded) data e_x_1 is decoded without a key (k_0) or with the wrong key (k_2), then a different (wrong) version of the data can be reconstructed. The user can define x_0 and x_2 to be any type of plausible data (i.e., data that appears to be genuine to a hostile actor, etc.).

Note that in order to have k_1 be "memorizable", one can have the user memorize a password p_1 and a transformation (e.g., hashing, etc.) can be used to map p_1 into k_1. Note that this version does NOT require a fixed k_1 unlike with the above example since the decoder will learn the mapping between (e_x_1+k_i) and x_i, so the key can be anything unlike in the example above described in connection with FIG. 2.

This model can be trained using stochastic gradient descent and a loss function that minimizes the mean squared error of the reconstruction. The input may also be preprocessed, for example by subtracting the mean and dividing by the standard deviation.

Figure 3:
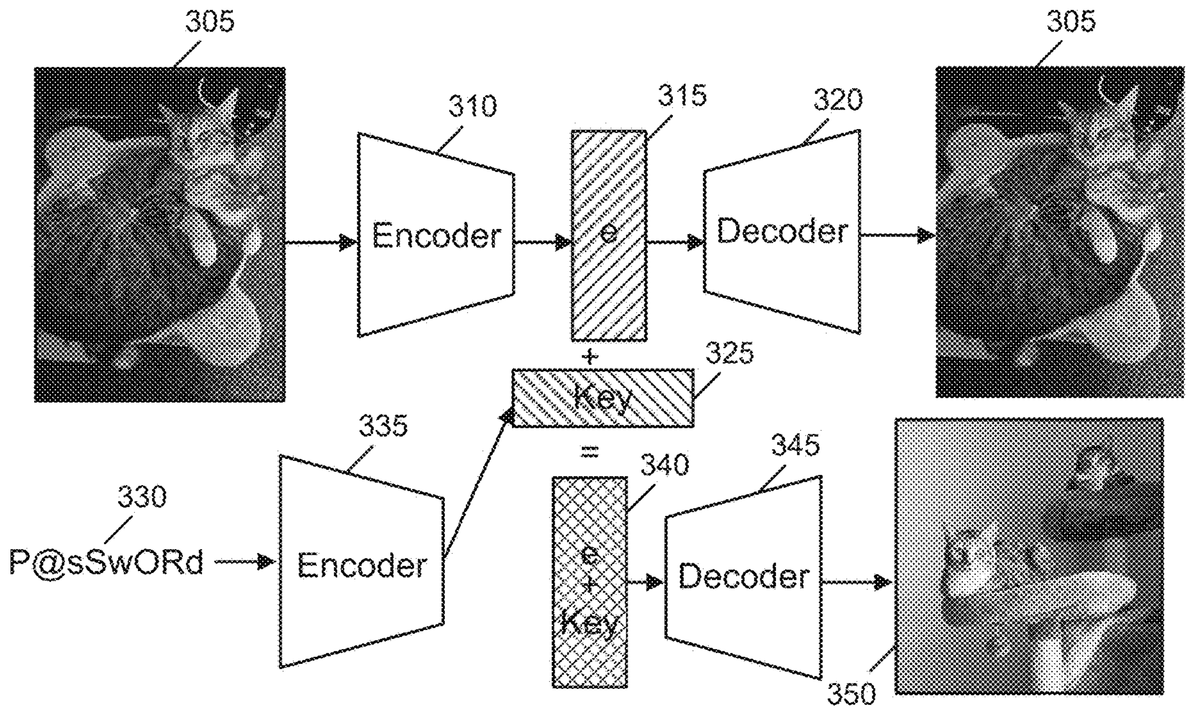
FIG. 3 is a diagram illustrating an architecture for accessing hidden data using an embedding space and a key generated by way of machine learning.

Loss=minimize(MSE(x_i, D(E(x_j)+k_i))) where E is the encoder model, D is the decoder model. Note that this requires a dataset of triplets (input, output, key) in order to train for (x_j, x_i, k_j), and in many cases k_j might be zero, in which case x_i==x_j FIG. 3 is a diagram illustrating a workflow adding a key in an embedded space. Here an autoencoder comprised of an encoder 310 and a decoder 320 can be used to create an embedding 315 of an image 305. In particular, the encoder 310 of the autoencoder is used to generate an embedding. The decoder 320 is configured so as to decode the embedding 315 to result in the image 305 (i.e., the same image input into the encoder 310). In addition, a password encoder 335, responsive to an input password 330 can generate a key 325. The embedding 315 and the key 325 can be combined and input into a specially configured decoder 345 which uses such input to generate a second image 350 (i.e., secret data, etc.). In some variations, decoder 345 can be the same as decoder 320 so long as such decoder is trained to decode e+key.

Backdoor attack. Suppose one wants to hide the data x_1 while storing x_0. An encoder-decoder model can be trained to map x_0 to an embedded space e_x_0 and a decoder can be trained to map to x_0.

A modification k_1 can be added such that when passing (x_0+k_1) to the encoder, it will produce e_x_1 and then the decoder maps this to x_1, the original data to be hidden. In this case, one can consider k_1 to be a backdoor adversarial attack in the encoder-decoder model, which is introduced with the purpose of encrypting the data. This process can be repeated for any number of samples x_2, x_3 and so on in order to provide multiple password and data representation options to the user.

Note that k_1 needs to have very specific values, so the processes described above in connection with FIG. 2 can be used to create a human memorizable password.

This model can be trained using stochastic gradient descent and a loss function that minimizes the mean squared error of the reconstruction. The input can also be preprocessed, for example by subtracting the mean and dividing by the standard deviation.

Figure 4:
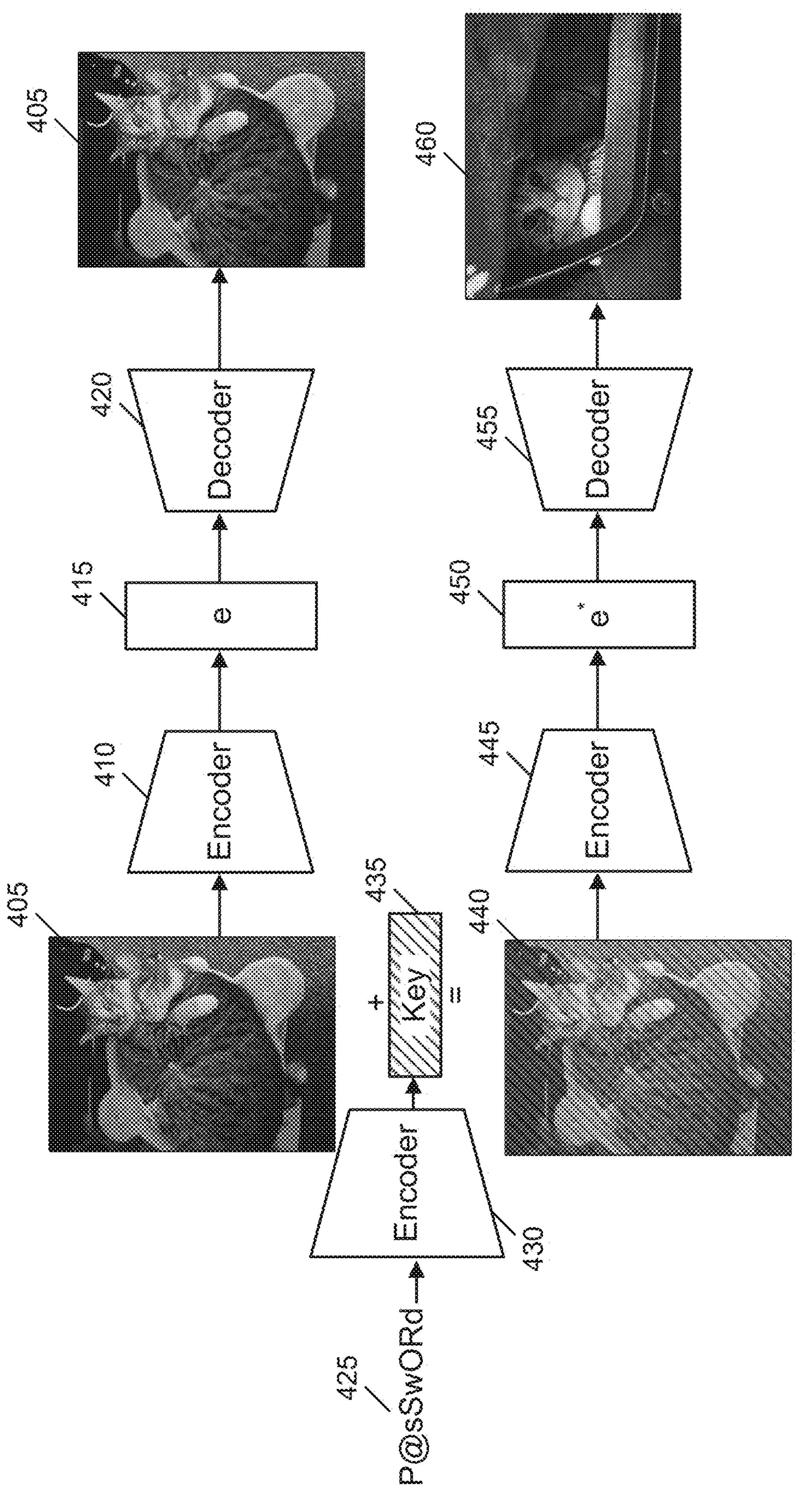
FIG. 4 is a diagram illustrating an architecture in which a password encoder generates a key for use with revealing secret data.

Loss=minimize(MSE(x_i, D(E(x_j+k_i)))) where E is the encoder model, D is the decoder model. Note that this requires a dataset of triplets (input, output, key) in order to train for (x_j, x_i, k_j) and for this particular version of the attack, most of the k_j will be zero and for those x_i==x_j FIG. 4 is a diagram illustrating a backdoor attack architecture in which a first autoencoder can generate an embedding 415 corresponding to a first image 405 using an encoder 410. The autoencoder is also configured such that a decoder 420 can generate the first image 405 from the embedding 415. A password encoder 425 can generate a key 435 from an inputted password 425. The key 435 can be combined with the first image 405 to result in modified image 440. This modified image 440 can be inputted into a second autoencoder which includes an encoder 445 to generate an embedding 450 which, in turn, can be decoded 455 to result in a second image 460 (i.e., the secret data, etc.). In some variations, encoders 410, 445 are different (i.e., separate and distinct encoders) while, in other variations, encoders 410, 445 comprise a single encoder. Similarly, in some variations, decoders 420, 455 are different (i.e., separate and distinct decoders) while, in other variations, decoders 420, 455 comprise a single decoder.

The key is the decoder. Another way that one might encrypt the data is by carrying the embedded version of the data and using the decoder model as the key. In this variation, there can be multiple decoder models D_1, D_2, D_3, . . . such that D_1(e_x_1)→x_1, D_2(e_x_1)→x_2, D_3(e_x_1)→x_3. In this case the model that is chosen by the user is the one that holds the key to reconstructing the true data from the embedded space.

Each of these models can be trained using stochastic gradient descent with a shared encoder across all models and a loss function that minimizes the mean squared error of the reconstruction. The input can also be preprocessed, for example by subtracting the mean and dividing by the standard deviation.

Loss=minimize(MSE(x_i, D_i(E(x_j)))) where E is the encoder model shared across all models, D_i is the decoder model for key i. Note that this requires a dataset of pairs (input, output) in order to train for (x_j, x_i). Stated differently, a set of pairs (input, outputS) can be required such that outputs is a list of the output for each decoder model, so the data would have shape (x_0, (x_0, x_1, . . . , x_n)) where x_0 is the output of decoder D_0, x_1 the output of decoder D_1 and so on.

Figure 5:
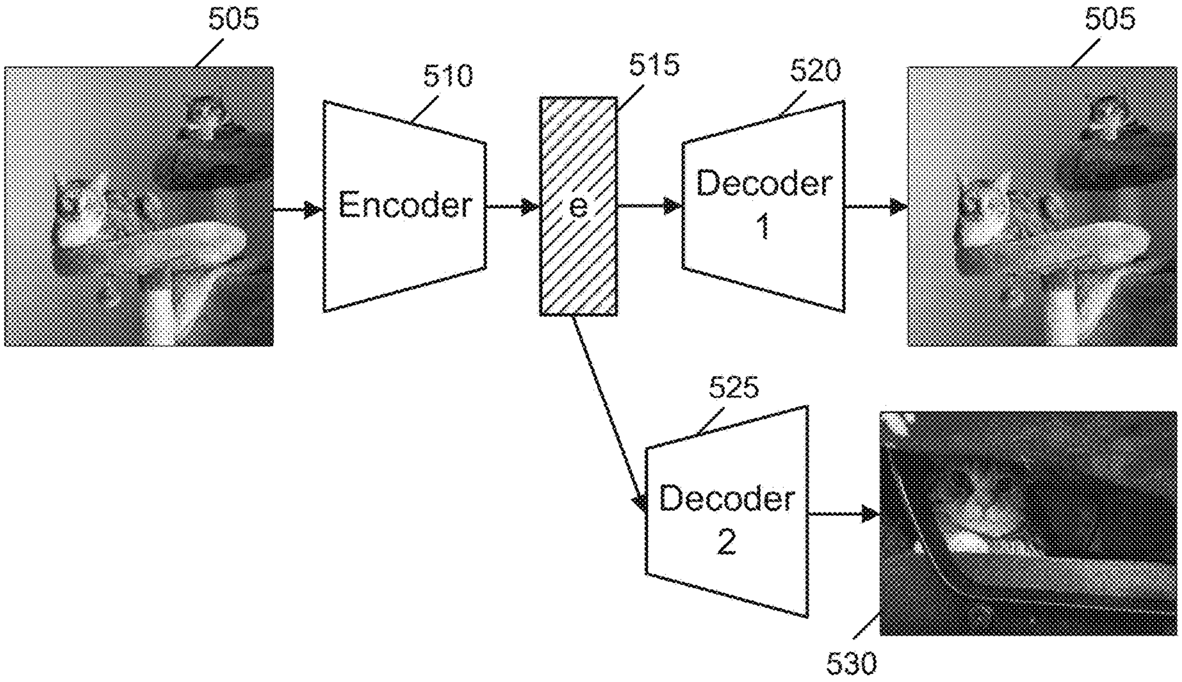
FIG. 5 is a diagram illustrating an architecture having two or more decoders which are each configured to return a different representation of an embedding.

FIG. 5 is a diagram for an architecture in which the key is the decoder. An autoencoder can include an encoder 510 which generates an embedding 515 from a first image 505. The autoencoder, in this variation, can include multiple decoders. A first decoder 520 is configured to generate the first image 505 based on the embedding 515. The second decoder 525 is configured to generate a second image 530 (i.e., the secret data) based on the embedding 515. In some implementations, the user or a command can be used to specify which decoder 520, 525 to use to generate the resulting output image.

Add key to the model parameters. Machine learning models typically have adjustable parameters (weights and biases) that are modified while the model is learning. While the foregoing describes modification of weights and biases, other types of parameters of a model can be modified (especially when the model architecture does not utilize weights and/or biases). This is where the learning happens. For example a typical operation is to multiply some input by a weight matrix and add a bias (y=W*x+b). During training, the values of the weights and biases are adjusted in order to minimize the error in the output of the model. Note that this operation describes a linear regression or part of a layer of a neural network, but the same can be applied to other models.

With this variation, a key k_1 can be provided such that when combined with the weights, biases or both will modify the behavior of the model such that it produces a different output.

So for example if the key is added to the weights, then one would have x_0=(W)*x_1+b and at the same time x_1=(W+k_1)*x_1+b. This will in practice mean that there are two models in one that are modified only by the key.

In order to train this model, stochastic gradient descent can be used to minimize mean squared error of the reconstruction. The model can be trained in an alternating fashion, such that first in one iteration the model would optimize x_0=(W)*x_1+b, then in the next iteration it would optimize x_1=(W+k_1)*x_1+b.

$$\text{Loss} = \text{minimize}(MSE(\text{x\_i}, (W + \text{k\_i}) * \text{x\_i} + b))$$

$$\text{Loss} = \text{minimize}(MSE(\text{x\_j}, (W) * \text{x\_i} + b))$$

$$\text{Loss} = \text{minimize}(MSE(\text{x\_i}, (W + \text{k\_i}) * \text{x\_i} + b))$$

$$\text{Loss} = \text{minimize}(MSE(\text{x\_j}, (W) * \text{x\_i} + b)), \text{etc} \ldots$$

Alternatively, the model can be first optimized for x_0=(W)*x_1+b, then after convergence, the model can be fine-tuned in an alternating fashion with x_1=(W+k_1)*x_1+b to make the model converge to the second configuration while keeping the original behavior unchanged. This arrangement can, in some implementations, require the use of different learning rates for each objective.

The key can be combined with one or more sets of parameters, for example it could be combined with only some of the weights of a specific layer, or with the bias, or both, or with all the layers, etc.

Figure 6:
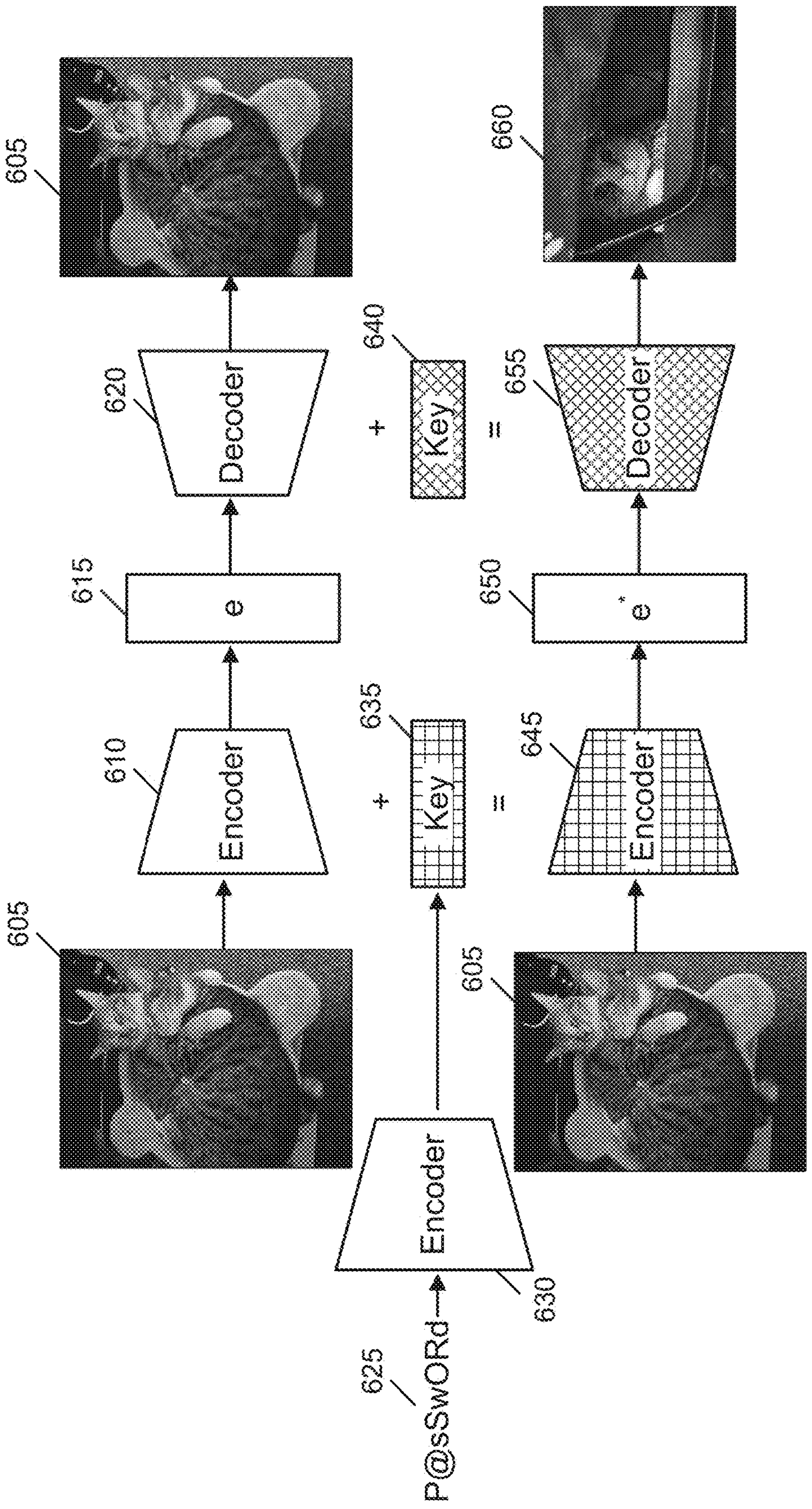
FIG. 6 is a diagram illustrating an architecture in which keys are used to modify aspects of an encoder and a decoder in order to return data in a hidden compartment.

FIG. 6 is a diagram illustrating an arrangement in which a key, when combined with the weights, biases, or both will modify the behavior of a model so that it produces a different output. Similar to previous examples, an autoencoder architecture can be provided in which an encoder 610 is configured to encode a first image 610 to generate an embedding 615. A decoder 620 can be configured so as to decode the embedding 615 to result in the first image. In this example, a key 635 can be used to modify one or more aspects (e.g., weights and/or biases, etc.) of the encoder 610 to result in a modified encoder 645. In addition or in the alternative, a key 640 can be used to modify one or more aspects (e.g., weights and/or biases, etc.) of the decoder 620 to result in modifier decoder 655. This autoencoder can be configured to encode the first image 605 using the modified encoder 645 to result in an embedding 650. This embedding can be decoded using the modified decoder 655 to result in a second image 660 (i.e., the secret data).

Key 635 can be generated by a password encoder 630 into which a password 625 is inputted. Key 640 can, in some variations, be the same as key 635. In other variations, a different password encoder can be utilized and the key 640 can be generated by inputting that same password 625 into such different password encoder. In other variations, key 640 can be generated using password encoder 630 and a different input password (a password other than password 625).

While the above describe techniques describe the operation of combining the data with the key as a summation operation, this operation can be any function F such that the shape of F(I, k) is the same as the shape of input I such that it can be consumed by the model where I in the input (x, e_x or any other representation of it) and k is the key. Other examples of operations include, but are not limited to, multiplication, division, exponentiation, logarithm with specified base, etc.

In some variations, the decoder can be trained to reconstruct random noise from e_x_1 alone.

In some variations, classical encryption can be included to the embedded vector e_x_1 so long as gradients are propagated to make sure the model can learn.

The models described herein can be trained in different ways. As an example, the models can be trained using stochastic gradient descent, the Adam optimization algorithm, among other optimization procedures.

In some variations, the models are only optimized for the samples of interest (i.e., the samples which are being encrypted) rather than optimizing for a full dataset; however, optimizing for a full dataset which includes the samples of interest is also possible or fine tuning a pre-trained model for the samples of interest.

In all cases the samples can be preprocessed before passing through the model.

Figure 7:
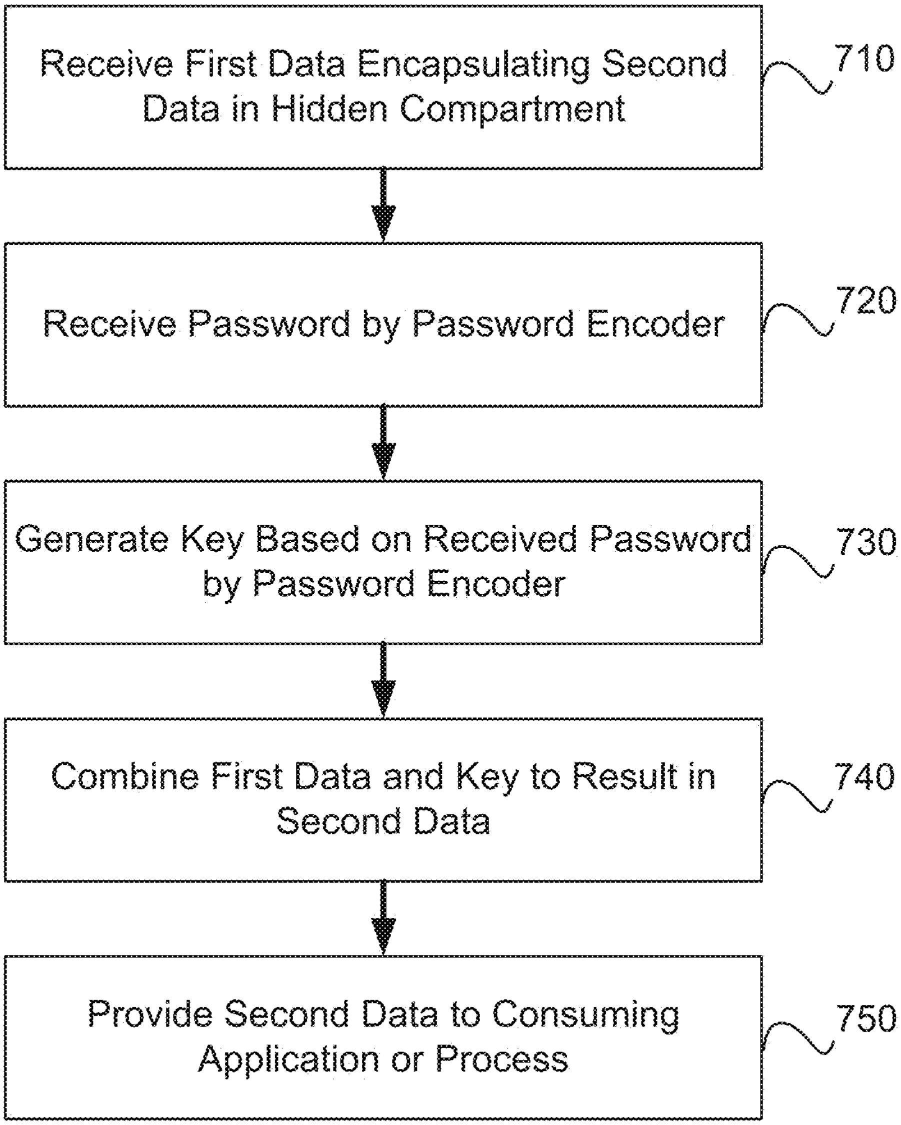
FIG. 7 is a first process flow diagram illustrating aspects relating to accessing data in hidden compartments.

FIG. 7 is a process flow diagram in which, at 710, first data is received that encapsulated second data in a hidden compartment. Further, at 720, a password is received by a password encoder. The password encoder, at 730, generates a key based on the password. The first data is later combined, at 740, with the key to generate the second data. The second data is then provided, at 750, to a consuming application or process. The consuming application or process can take different actions with regard to the second data such as displaying the second data, loading the second data into memory, transmitting the second data to a remote computing device, and/or storing the second data in persistence.

Figure 8:
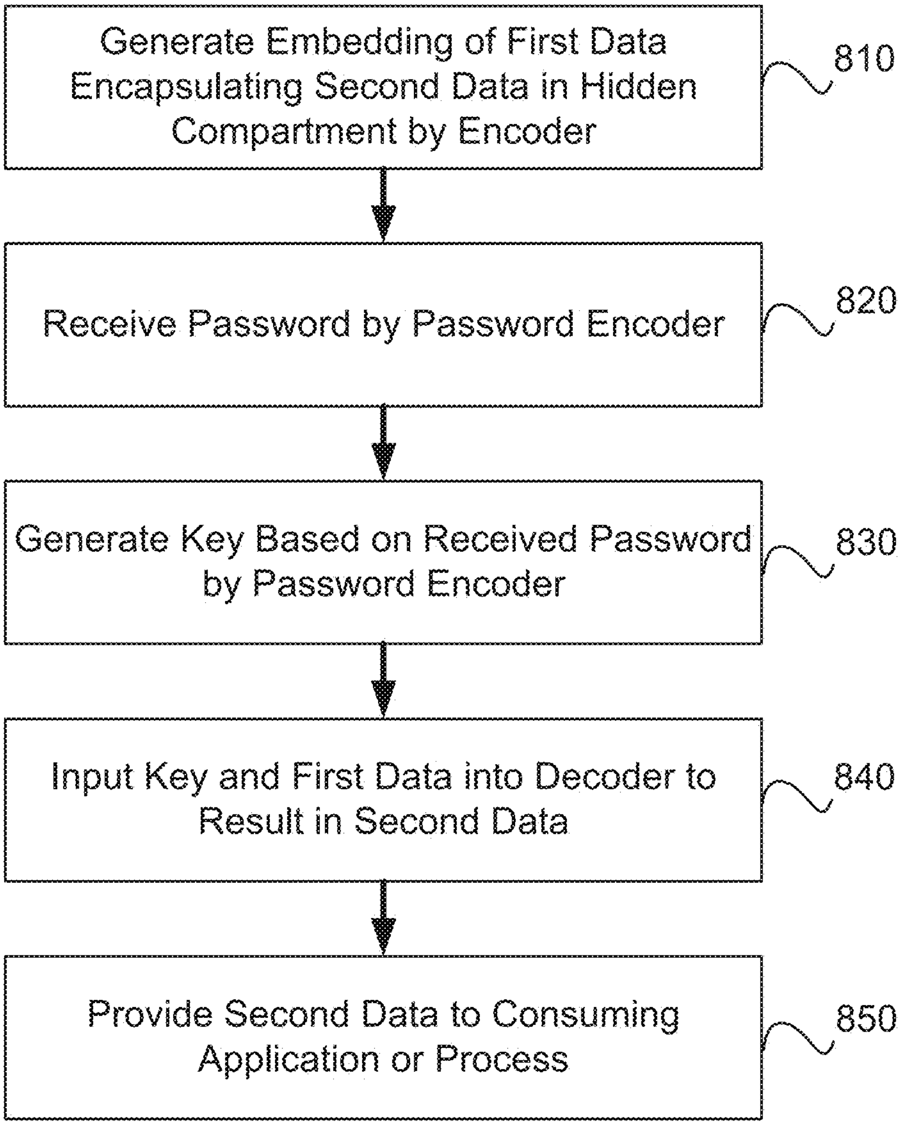
FIG. 8 is a second process flow diagram illustrating aspects relating to accessing data in hidden compartments.

FIG. 8 is a process flow diagram in which, at 810, an embedding of first data is generated by an encoder forming part of a model. Here, the model encapsulates second data in a hidden compartment. In addition, at 820, a password is received by a password encoder. The password encoder generates, at 830, a key based on the password. A combination of the embedding and the key are input, at 840, into a decoder (also forming part of the model) to generate the second data. Thereafter, at 850, the second data is provided to a consuming application or process. The consuming application or process can take different actions with regard to the second data such as displaying the second data, loading the second data into memory, transmitting the second data to a remote computing device, storing the second data in persistence, or using the second data as part of a different process or workflow.

Figure 9:
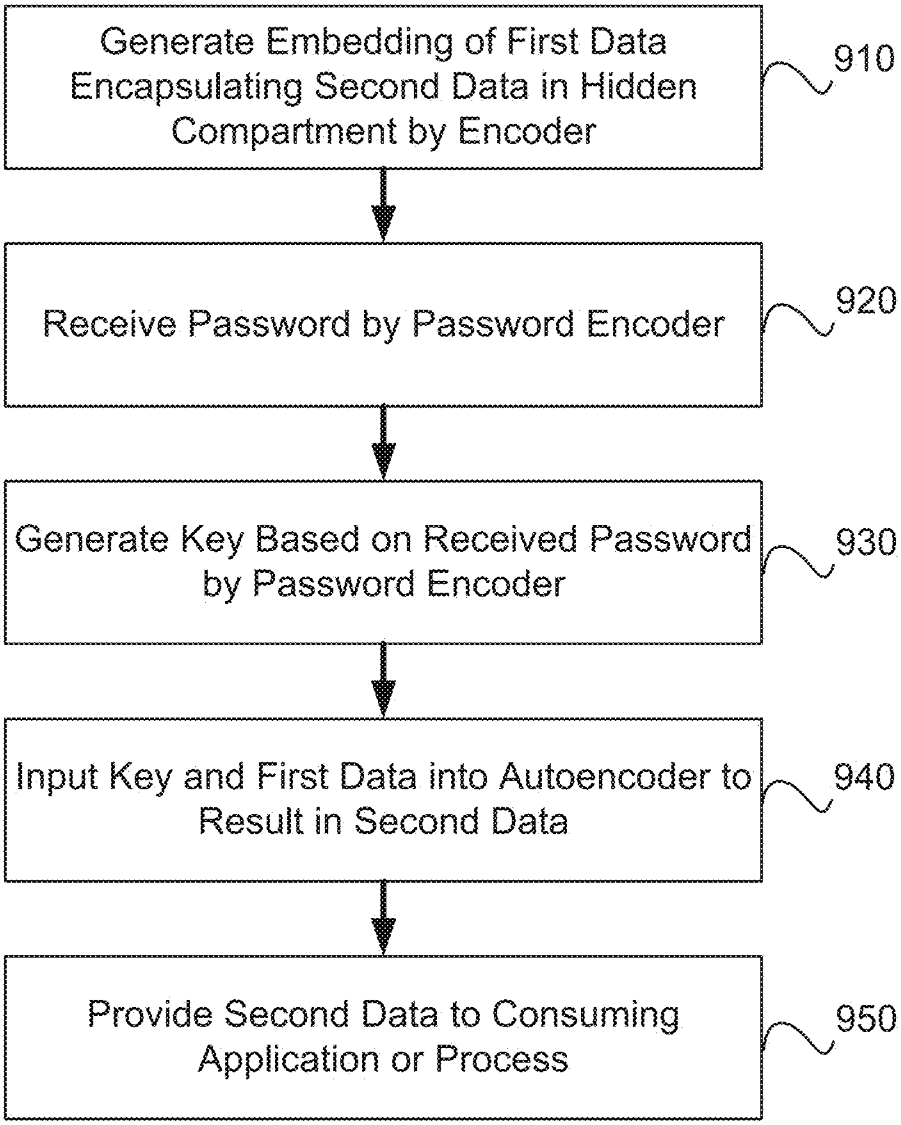
FIG. 9 is a third process flow diagram illustrating aspects relating to accessing data in hidden compartments.

FIG. 9 is a process flow diagram in which, at 910, an embedding of first data is generated by an encoder forming part of an autoencoder. Here, the model encapsulates second data in a hidden compartment. In addition, at 920, a password is received by a password encoder. The password encoder generates, at 930, a key based on the password. A combination of the embedding and the key are input, at 940, into an autoencoder to generate the second data. Thereafter, at 950, the second data is provided to a consuming application or process. The consuming application or process can take different actions with regard to the second data such as displaying the second data in a graphical user interface, loading the second data into memory, transmitting the second data to a remote computing device, storing the second data in persistence, or using the second data as part of a different process or workflow.

Figure 10:
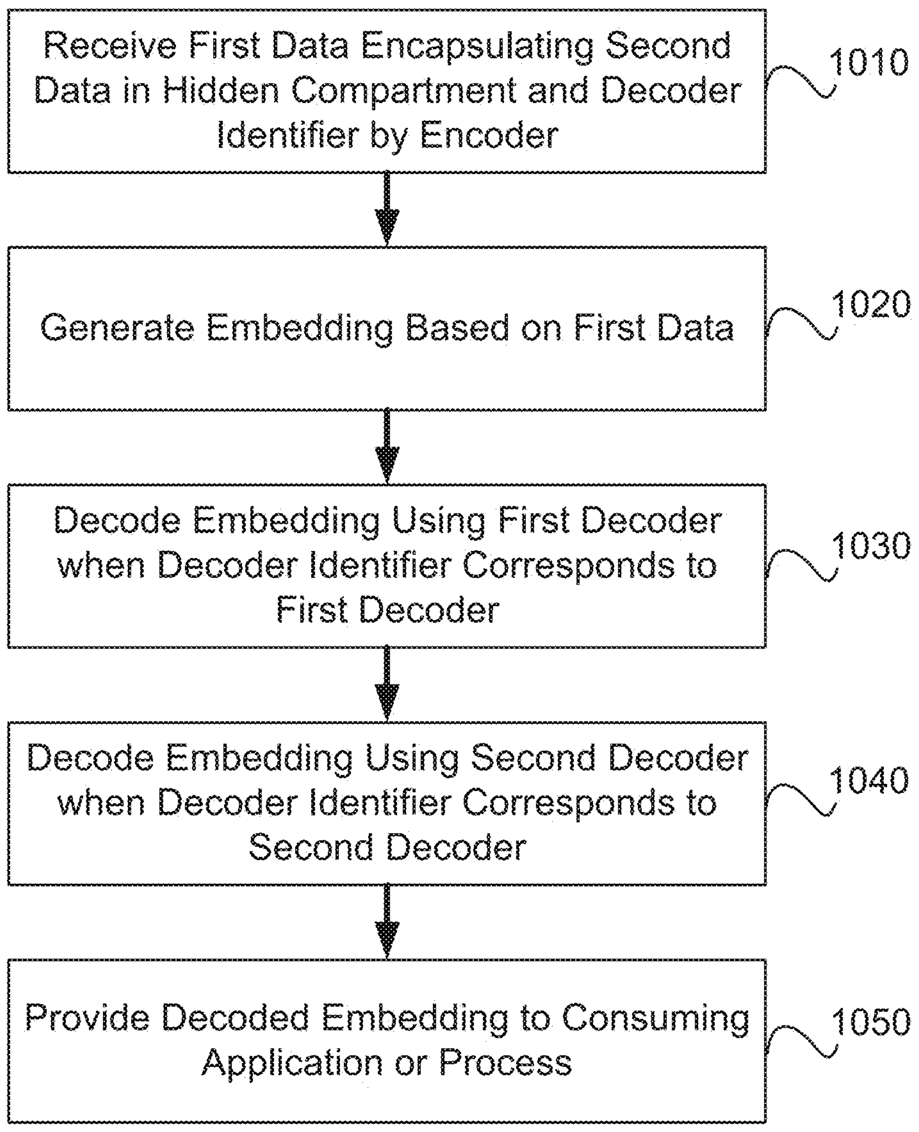
FIG. 10 is a fourth process flow diagram illustrating aspects relating to accessing data in hidden compartments.

FIG. 10 is a diagram in which, at 1010, an encoder receives first data that encapsulates second data in a hidden compartment and a decoder identifier corresponding to either of a first decoder or a second decoder. The encoder, at 1020, generates an embedding corresponding to the first data. The first decoder, at 1030, decodes the embedding to result in a representation of the first data when the decoder identifier corresponds to the first decoder. The second decoder, at 1040, decodes the embedding to result in a representation of the second data when the decoder identifier corresponds to the second decoder. Arrangements can also be provided in which there are three or more decoders each having a corresponding identifier. Subsequently, at 1050, the decoded embedding is provided to a consuming application or process. The consuming application or process can take different actions with regard to the decoded embedding such as displaying the decoded embedding in a graphical user interface, loading the decoded embedding into memory, transmitting the decoded embedding to a remote computing device, storing the decoded embedding in persistence, or using the decoded embedding as part of a different process or workflow.

Figure 11:
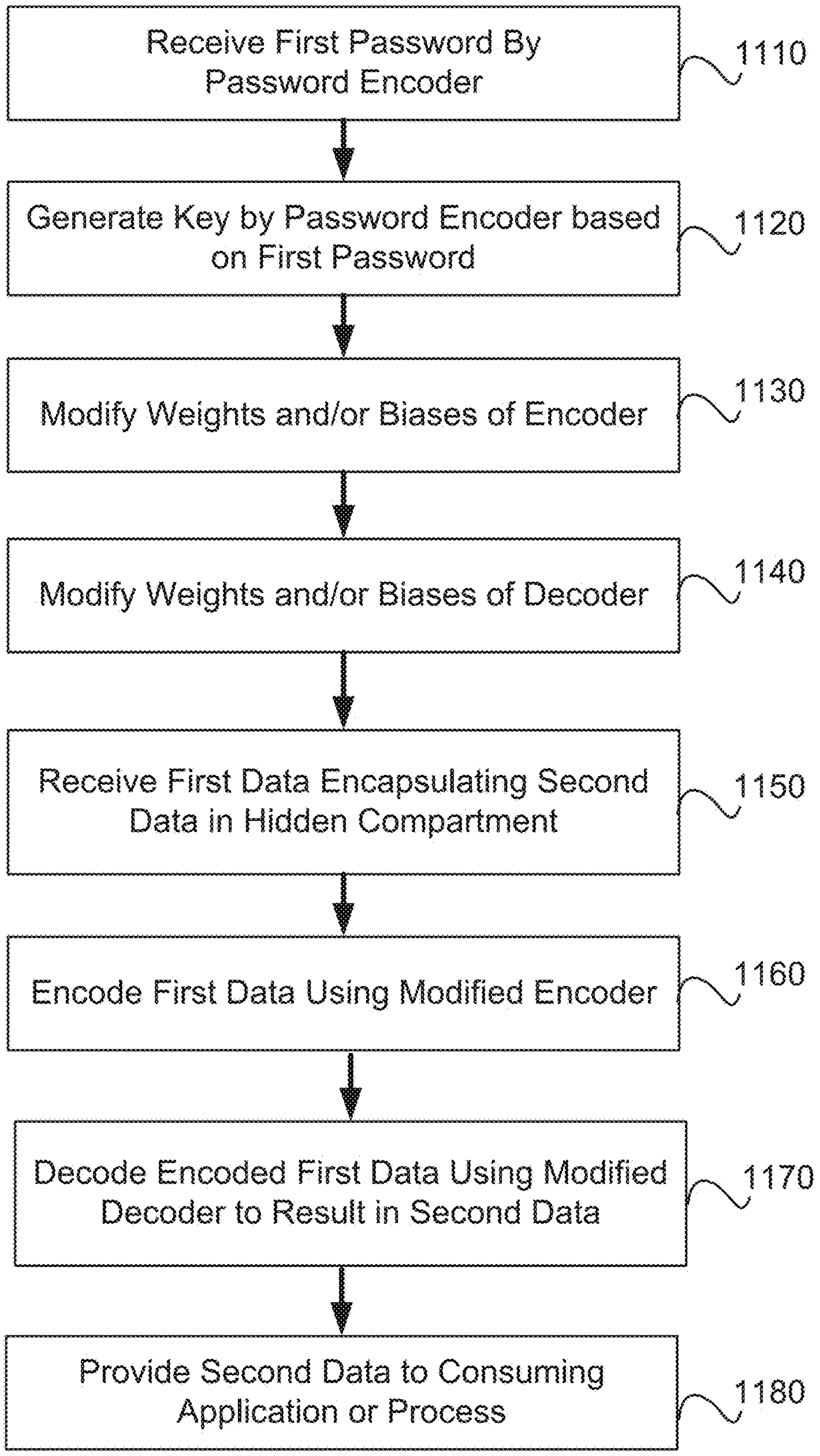
FIG. 11 is a fifth process flow diagram illustrating aspects relating to accessing data in hidden compartments.

FIG. 11 is a diagram in which, at 1110, a first password is received by a password encoder. The password encoder, at 1120, generates a first key based on the first password. The first key can be used, at 1130, to modify weights and biases of an encoder based to result in a modified encoder. A second key can be used, at 1140, to modifying weights and biases of a decoder operating in tandem with the encoder to result in a modified decoder. Later, at 1150, first data is received that encapsulates second data in a hidden compartment. The modified encoder, at 1160, encodes the first data to generate an embedding. The modified decoder, at 1170, decodes the embedding to result in a representation of the second data. The representation of the second data is provided, at 1180, to a consuming application or process. With such an arrangement, inputting the first data into the encoder and the decoder prior to modification results in a representation of the first data. In addition, in some variations, only one of the encoder and the decoder is modified. The consuming application or process can take different actions with regard to the representation of the second data such as displaying the representation of the second data in a graphical user interface, loading the representation of the second data into memory, transmitting the representation of the second data to a remote computing device, storing the representation of the second data in persistence, or using the representation of the second data as part of a different process or workflow.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
- receiving a first password by a password encoder;
- generating, by the password encoder using the first password, a first key;
- combining parameters of an encoder model with the first key to result in a modified encoder;
- combining parameters of a decoder model operating in tandem with the encoder with a second key to result in a modified decoder, the encoder being different from the password encoder and comprising one or more machine learning models;
- receiving first data encapsulating second data in a hidden compartment;
- encoding, by the modified encoder, the first data to generate an embedding;
- decoding, by the modified decoder, the embedding to result in a representation of the second data;
- providing the representation of the second data to a consuming application or process; wherein:
  - inputting the first data into the encoder and the decoder prior to modification results in a representation of the first data; and
- the consuming application or process performs at least one of: loading the representation of the second data into memory, storing the representation of the second data in physical persistence, transmitting the representation of the second data over a network to a remote computing device, or causing the representation of the second data to be displayed in a graphical user interface.

2. The method of claim 1 further comprising:
- receiving a second password by the password encoder;
- generating, by the password encoder based on the second password, the second key.

3. The method of claim 2, wherein the first password is different than the second password.

4. The method of claim 2, wherein the first password is same as the second password.

5. The method of claim 1 further comprising:
- receiving a second password by a second password encoder;
- generating, by the second password encoder based on the second password, the second key.

6. The method of claim 1, wherein the first data is a first image and the second data is a second, different image.

7. The method of claim 1, wherein the first data comprises a first audio file and the second data comprises a second, different audio file.

8. The method of claim 1, wherein the first data is a first video file and the second data comprises a second, different video file.

9. The method of claim 1, wherein the first data is a first text file and the second data comprises a second, different text file.

10. The method of claim 1, wherein the first data comprises a file of a first type and the second data comprises a file of a second, different type.

11. The method of claim 1, wherein the first key is different than the second key.

12. The method of claim 1, wherein the first key is same as the second key.

13. The method of claim 1, wherein the modified model parameters of the encoder model and the decoder model comprise weights and biases.

14. The method of claim 1, wherein the encoder model and the decoder model each comprise a neural network, and wherein the neural networks are trained using stochastic gradient descent and a loss function that minimizes mean squared error.

15. The method of claim 1, wherein the encoder model and the decoder model form part of an autoencoder, the autoencoder comprising a bottleneck layer having a smaller number of neurons than layers before and after it, the bottleneck layer generating the embedding as a compressed representation of the first data.

16. The method of claim 1, wherein the hidden compartment encapsulates third data in addition to the second data, the method further comprising: receiving a third password by the password encoder; generating, by the password encoder based on the third password, a third key;
- combining the third key with the embedding to generate a representation of the third data; and
- providing the representation of the third data to the consuming application or process.

17. A computer-implemented method comprising:
- receiving a first password by a password encoder, the password encoder comprising one or more machine learning models;
- generating, by the password encoder using the first password, a first key;
- modifying model parameters of an encoder model using the first key to result in a modified encoder;
- receiving first data encapsulating second data in a hidden compartment;
- encoding, by the modified encoder, the first data to generate an embedding;
- decoding, by a decoder operating in tandem with the modified encoder, the embedding to result in a representation of the second data, the decoder comprising one or more machine learning models;
- providing the representation of the second data to a consuming application or process;
- wherein inputting the first data into the encoder and the decoder prior to modification results in a representation of the first data.

18. The method of claim 17 further comprising:
- receiving a second password by the password encoder;
- generating, by the password encoder based on the second password, a second key.

19. The method of claim 18, further comprising:

modifying parameters of a decoder model for the decoder based on the second key to result in a modified decoder;

wherein the decoding is performed by the modified decoder.

20. The method of claim 18, wherein the first key is different than the second key.

21. The method of claim 18, wherein the first key is same as the second key.

22. The method of claim 18, wherein the modified model parameters of the encoder model and the decoder model comprise weights and biases.

23. The method of claim 22, further comprising:

modifying model parameters of a decoder model for the decoder based on the second key to result in a modified decoder;

wherein the decoding is performed by the modified decoder.

24. A computer-implemented method comprising:

receiving a first password by a password encoder, the password encoder comprising one or more machine learning models;

generating, by the password encoder using the first password, a first key;

modifying weights and biases of a decoder operating in tandem with an encoder using the first key to result in a modified decoder, the decoder comprising one or more machine learning models, the encoder being different from the password encoder and comprising one or more machine learning models;

receiving first data encapsulating second data in a hidden compartment;

encoding, by the encoder, the first data to generate an embedding;

decoding, by the modified decoder, the embedding to result in a representation of the second data; and providing the representation of the second data to a consuming application or process;

wherein inputting the first data into the decoder prior to modification results in a representation of the first data.

25. The method of claim 24 further comprising:

receiving a second password by the password encoder;

generating, by the password encoder based on the second password, a second key.

26. The method of claim 24, further comprising:

modifying weights and biases of the encoder based on the second key to result in a modified encoder;

wherein the encoding is performed by the modified encoder.

27. The method of claim 26, wherein the first key is different than the second key.

28. The method of claim 26, wherein the first key is same as the second key.

29. The method of claim 24 further comprising:

receiving a second password by a second password encoder;

generating, by the second password encoder based on the second password, a second key.

30. The method of claim 24, wherein the first data comprises a file of a first type and the second data comprises a file of a second, different type.

* * * * *